United States Patent [19]
Whitner et al.

[11] Patent Number: 6,148,323
[45] Date of Patent: *Nov. 14, 2000

[54] SYSTEM AND METHOD FOR MANAGING THE EXECUTION OF SYSTEM MANAGEMENT

[75] Inventors: Richard B. Whitner; Douglas P. Drees; William G. Golson, all of Fort Collins, Colo.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/581,389

[22] Filed: Dec. 29, 1995

[51] Int. Cl.⁷ ...................................................... G09F 9/00
[52] U.S. Cl. ............................................................. 709/105
[58] Field of Search ................................. 395/672, 673, 395/674, 675, 677; 711/112; 709/102, 103, 104, 105, 109

[56] References Cited

U.S. PATENT DOCUMENTS

| | | | |
|---|---|---|---|
| 4,009,347 | 2/1977 | Flemming et al. | 370/321 |
| 4,356,546 | 10/1982 | Whiteside | 395/182.08 |
| 4,949,278 | 8/1990 | Davies et al. | 395/11 |
| 5,179,700 | 1/1993 | Aihaza et al. | 395/650 |
| 5,187,787 | 2/1993 | Skeen et al. | 395/600 |
| 5,276,878 | 1/1994 | Sutton et al. | 711/112 |
| 5,329,619 | 7/1994 | Page et al. | 395/200 |
| 5,355,488 | 10/1994 | Cox et al. | 595/650 |
| 5,367,609 | 11/1994 | Hopper et al. | 395/2.87 |
| 5,440,740 | 8/1995 | Chen et al. | 395/650 |
| 5,442,989 | 8/1995 | Baker et al. | 395/650 |
| 5,475,819 | 12/1995 | Miller et al. | 395/200 |
| 5,530,861 | 6/1996 | Diamant et al. | 705/8 |

OTHER PUBLICATIONS

Harvey, Deitel, An Introduction to Operating Systems, Addison–Welsey Publishing Company, pp. 573–575, Feb. 1990.
"An Introduction to Operating System", Harvey M. Deitel, Addison—Wesley Publishing Company. pp. 573–575.

*Primary Examiner*—Alvin E. Oberley
*Assistant Examiner*—Peter Stecher

[57] ABSTRACT

A task manager for operating and performing management tasks called for by a system administration manager. The task manager includes a command task manager for performing command tasks, a function task manager for performing function tasks, and a remote task execution manager for performing remote or distributed task. In addition, the task manager includes a single application program interface for interfacing the command task manager, function task manager, and remote task execution manager with the system administration manager. The task manager further performs error handling and automatic logging operations. The task manager uses a task registration manager which stores the individual task descriptions and makes them available to the task manager.

19 Claims, 10 Drawing Sheets

SYSTEM AND METHOD FOR MANAGING THE EXECUTION OF SYSTEM MANAGEMENT

FIELD OF THE INVENTION

This invention generally relates to the system administration of a computer system, and more particularly, to a task manager system and method for creating and performing system management tasks on one or more computer systems.

BACKGROUND OF THE INVENTION

The operating system of most computers provides an administration tool or a system administration manager for invoking and performing system management tasks. The hardware of a computer system, the various facilities included within the operating system, such as the file system facility, the print spooling facility, and the networking facility, as well as the operating system itself must all be managed. This predicament means that computer systems require some involvement by a human user or a manager of the computer system for such operations as specifying certain configuration parameters, monitoring ongoing activity, or troubleshooting some problem that has arisen. These management or administration tasks can be performed manually in many operating systems via direct manipulation of configuration files or direct invocation of specific administration utility programs. But in most modern operating systems, an easy to use, interactive software program is typically provided that hides the details of the file formats and the utility program syntax, while providing a higher level presentation for the user. This program, hereinafter referred to as the system administration manager (SAM), performs the query tasks on behalf of the user and then displays the discovered configuration and status information to the user in an easily manipulated format. The SAM also performs configuration or status change tasks on behalf of the user, and thus, provides an easy mechanism or interface for specifying the details of the task to be performed.

The query tasks retrieve information about the current configuration and state of the system or facility being managed. Configuration change tasks actually make changes to the configuration or state of the system or facility. These tasks are implemented as either separate utility programs (referred to in the UNIX industry as "commands") that are invoked by a command task manager or as a collection of functions contained in a shared library that are called by a function task manager. In addition, if the system or facility being managed is shared across multiple computer systems, some of these tasks must be performed on one or more of these computer systems simultaneously. This kind of distributed task would be performed by a remote task execution manager which communicates the task to be performed, with its associated parameters, to either a command task manager or a function task manager running on each of the other computer systems as appropriate.

In prior art implementations of the command task manager and function task manager on a single computer system, each task manager has its own application programming interface (API), task description language, and data structures. In addition, the support for such common features as error handling or event logging vary from manager to manager. These inconsistencies have led to numerous problems for developers of system management applications, four classes of which are discussed hereinafter.

A first and most obvious problem is programmer confusion. The different APIs and features have made the various task managers hard to learn, and therefore, have increased the training costs of software developers. This confusion is also the root cause of many programming errors.

A second class of problems is related to redundant implementations of similar functionality. This amounts to negligent use of the resources available to the SAM by requiring two sets of code to perform the same function implemented by separate facilities. Not only do these redundant implementations increase the initial cost of development, they also result in duplication in ongoing maintenance of the task managers, since similar changes or improvements have to be made in multiple places and in different ways.

A third class of problems is inconsistencies in the user interface from one task to another. The variation in task type invariably leads to variations in presentation to the user. This is undesirable since user interface inconsistencies are a leading cause of error and confusion for users.

And finally, the inconsistency between the command task manager and the function task manager have made it difficult to implement a remote task execution manager. Since the remote task execution manager must be able to communicate either with a command task manager or a function task manager on the remote computer system, depending upon the type of task being performed, any differences in the APIs of the two managers requires extra work in implementing the interface.

In the future, new technologies and protocols for both network and system management will lead to new ways to implement management tasks. Emerging standards will require new task execution managers that are uniquely configured to manage tasks implemented using those standards. Therefore, it is important to provide an extensible architecture for system management task execution to avoid any more proliferation of inconsistent APIs, description languages, and data structures.

Thus, a heretofore unaddressed need exists in the industry for a system and method that provides for all task execution management functions using a single interface and that is more extensible than existing implementations.

SUMMARY OF THE INVENTION

The present invention overcomes the inadequacies and deficiencies of the prior art as disclosed hereinbefore and as well known in the industry. The present invention provides for a task manager that can be employed as a part of a system administration manager (SAM) on a computer system. The task manager provides a simple and consistent interface for creating and performing management tasks, combining the features of the function task management, command task management, and remote or distributed task execution management. The task manager provides a single API for all task execution, a single task description language to specify the implementation of tasks, common shared functionality for such things as error handling, event logging, task description registration, and a command line interface. In the preferred embodiment, the present invention operates in conjunction with a task registration manager and a plurality of submanagers including a command task manager, a function task manager, and a remote task execution manager.

A management task is defined for purposes of the present invention as an organized collection of one or more separate operations performed on a system or facility for purposes of retrieving configuration or status information from, or making configuration or status changes to, the system or facility. Each management task is identified by a string keyword identifier, defined in a task description file, and implemented as one or more callable functions in a shared library, as a command or script, or as an operation on a shared distributed resource. The target of a management task request can be the local computer system or host on which the task manager is currently installed and running and/or one or more remote computer systems.

Since all of the aforementioned features of the task manager are brought together under a single manager interface and the tasks are described in a common language, the architecture of task management is simpler and more efficient than that in the prior art because it can leverage the jobs performed by the various sub- managers.

In accordance with a feature of the present invention, remote tasks are described in platform independent terms, greatly facilitating the distributed execution of tasks in a heterogeneous environment. The tasks are uniquely identified not by how they are performed, but by a string identifier or name. Therefore, the implementation of a task on one computer system can be different than that on another and yet a single remote task execution manager can request the same task be performed on both regardless of the differences in implementation. Also, by implementing a single facility that brings together all of the task management features into one application program interface (API), the developer of the system management application that invokes these tasks need not know the implementation of the task being executed in order to perform the task. In addition, the implementation of any specific task can be changed from one type to another without requiring changes in the application program that invokes the task as long as the task interface (i.e., the number, type, and meaning of the parameters passed to the task) is unchanged.

In architecture, the task manager is configured in a computer memory as a set of instructions and shared data structures that can be shared among one or more system management application software programs and includes a single API that can be used to invoke one or more sub-managers. For purposes of illustrating the present invention, the sub-managers include a function task manager, a command task manager, and a remote task execution manager. A task registration manager and an abstract data access facility interact with the task manager in order to support its operation. When implementing the present invention as a program on a generic computer, the computer is reconfigured into a specific computer for operating in the manner described herein.

The present invention can be thought of as a portion of a software program comprising executable instructions (i.e., computer readable) encoded in a computer memory so as to cause the computer to function in the following manner. Initially, the task manager receives a request to perform a particular management task by a calling program. The task manager first obtains the task description for that task from the task registration manager. At essentially the same time, the task registration manager looks up and loads into memory any shared libraries necessary for the execution of the requested task. The task manager then creates and initializes a dynamic task state data structure into which all the information gathered by the task manager about the operation of the task, i.e., the task detail and its execution modes, is inserted. Next, the task manager determines whether the target of the task is the local host or a domain of hosts based upon either the task type or the parameters of the request. If the target is a domain, the task is sent to the remote task execution manager for execution. If the target is the local host, as is most often the case, the task manager determines whether the task is a command or function task and then sends the task to the appropriate sub-manager for execution. Upon completion of the execution of the task by the sub-manager, the dynamic state data structure is disposed of and the error status of the task and any resultant data is returned to the calling program.

Command tasks targeted at the local host are passed off to the command task manager where a command invocation string is created from a combination of the task description and data parameters passed off with the task. A separate process is then forked for executing the created command string via a POSIX shell. A post processor examines the post processing directives in the task description and processes the output objects (i.e., the output and error data and the command exit code) of the command per those directives. Lastly, the results are returned to the task manager.

Function tasks targeted at the local host are passed off to the function task manager where one or more (e.g., C language) functions are called. Presumably, these functions are configured as part of a shared library that is part of the system management application. However, these functions may be configured as part of the main software program (such as in those defined in a common set of generic utility tasks). This shared library will already be loaded as hereinbefore described. The function task manager, in the preferred embodiment, supports three function types: an init function, a perform function, and a cleanup function. The perform function must be specified in the task description and is the function that performs the actual task operations. The init and cleanup functions are optional and serve to initialize and then cleanup or dispose of data structures used during the performance of the task respectively. If an init function is specified, it is called first. The perform function specified in the task description is then called and the return code of that function is optionally processed by an exit processor. Finally, if a cleanup function is specified, it is called.

Alternatively, command or function tasks targeted at a domain of host or domain tasks are passed off to the remote task execution manager. Though the remote task execution manager is not the subject of the present invention, for purposes of disclosing and teaching the present invention, the remote task execution manager is briefly described herein. The remote task execution manager can be used either to execute a function or command task on some number of remote computer systems or to execute a domain task. It is assumed for purposes of the following discussions that the remote task execution manager (or domain task manager) is limited regarding the set of computer systems that can be the target of a remotely executed task. It is assumed for purposes of disclosing the present invention that the only domain supported are members of an NFS diskless cluster. The NFS diskless cluster is a set of computer systems that share a specific set of resources including a root file system server which uses the industry standard network file system protocol.

When a function or command task is passed off to the remote task execution manager, it determines the list of computer systems on which to execute the task by retrieving a list of members in the NFS diskless cluster of which the local computer is a member. It then uses a remote communication protocol over a computer network connection to invoke an agent software program on each of the target computer systems. It passes the task name and a copy of the passed in data parameters to each of these agent programs. Each agent program is configured to use the present invention to execute the task on the computer system on which it is running. When the present invention has completed the task execution and has returned its results to the agent, the agent passes the task results back to the originating remote task execution manager and then it exits. When all of the agent programs running on the target computer systems have returned their individual results, the remote task execution manager merges those results and returns them to the task manager.

When a domain task is passed of f to the remote task execution manager, information about this specific task, i.e., the passed in data parameters, are used to update a database that is used to manage shared resources across the NFS diskless cluster. This database stores the intent of the user of the SAM regarding which resources are to be shared and the attributes of the shared resources so that, at a later time when a new cluster client system is added to the cluster, the process of adding the new client to the cluster will include automatically configuring the new system to use these same shared resources. Domain task descriptions include specifications regarding how to update the shared resource database. Optionally, a remote task can also be specified. This task must be either a command or a function task. If a remote task is specified, after any database updates have been performed, the remote task is executed on all the clients of the cluster in the same manner as hereinbefore described for executing remote command or function tasks.

An advantage of the task manager system and method of the present invention is that they provide enhanced ability to support independent development of related system administration products. Particularly, there are fewer architectural components to document and manage. Further, the single management interface configuration is more consistent and more understandable than the prior art multi-interface configuration.

Another advantage of the task manager system and method of the present invention is that they provide access to all management task available on the host computer system. For example, tasks written for the core system administration product are accessible to other add on or optional system management applications that also use the task manager.

Another advantage of the task manager system and method of the present invention is that they perform common operations such as event logging, error handling, and shared library look up and loading.

Another advantage of the task manager system and method of the present invention is that they insulate the task consumer from underlying technology changes, e.g., new protocols and other new technologies, as SAMs evolve over time.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The present invention can be better understood with reference to the following drawings. The elements of the drawings are not necessarily to scale, emphasis instead being placed upon clearly illustrating the principles of the present invention. Furthermore, like reference numerals designate corresponding parts throughout the several views.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

I. Architecture

A task manager in accordance with the present invention can be stored on any computer readable medium for use by or in connection with a computer related system or method. In the context of this document, a computer readable medium is an electronic, magnetic, optical, or other physical device or means that can contain or store a computer program for use by or in connection with a computer related system or method.

Figure 1:
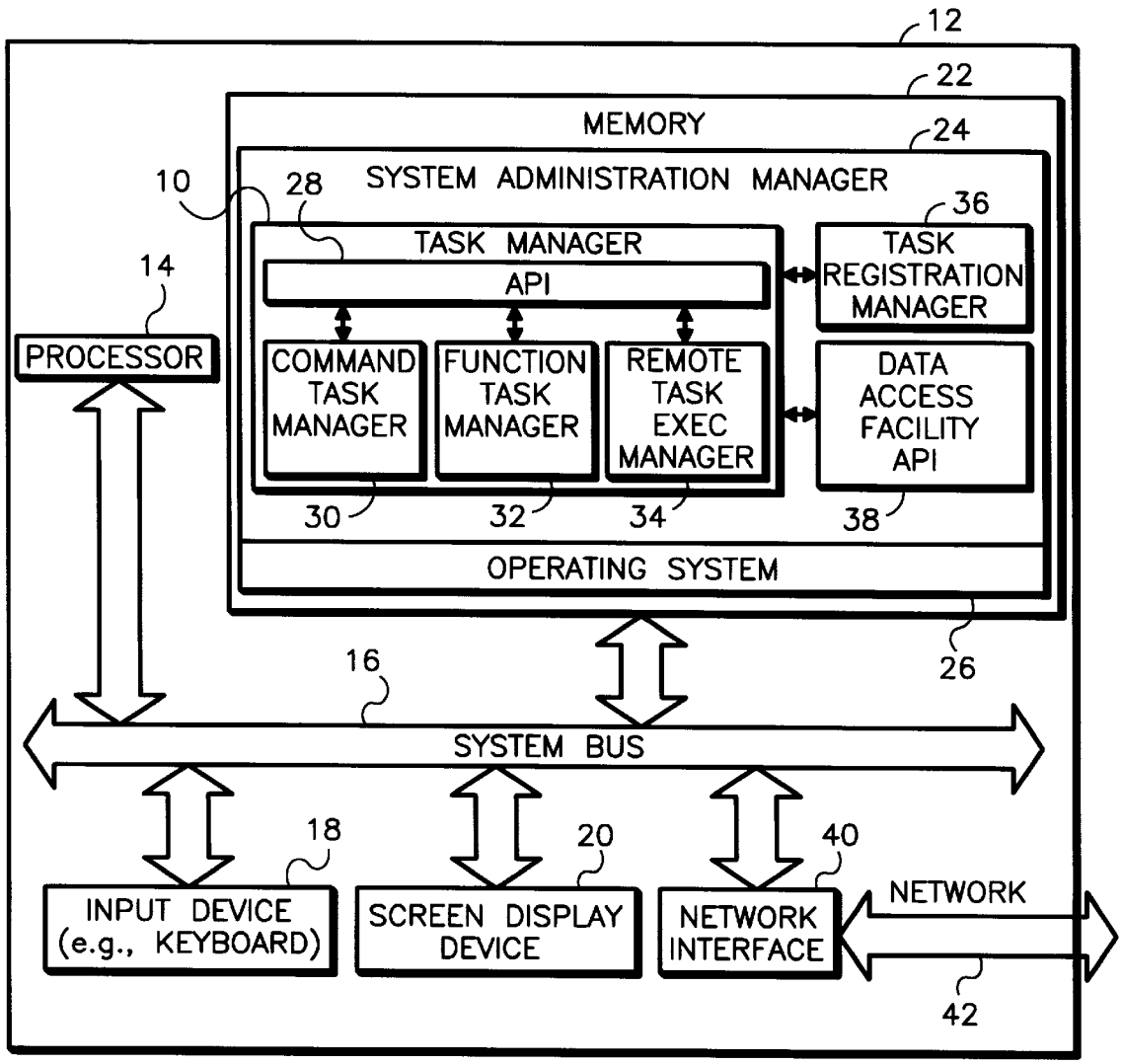
FIG. 1 is a block diagram of a task manager in accordance with the present invention in the context of a computer system.

FIG. 1 shows a block diagram of the computer hardware that includes a task manager 10 in accordance with the present invention. Shown in FIG. 1 is a computer system 12 that contains a processor 14. The processor 14 communicates with other elements within the computer system 12 via a system bus 16. An input device 18, for example, a keyboard or mouse, is used to input data from a user of the computer system 12, and a screen display device 20 is used to output data to the user. A memory 22 within the computer system 12 contains the task manager 10. The task manager 10 is preferably implemented as part of a system administration manager (SAM) 24, which communicates with a conventional operating system 26 to create and perform management tasks. When performing task management functions, the task manager 10 often receives data inputted by the user via input device 18 and returns data to the user via screen display device 20.

The task manager 10 includes a single management application program interface (API) 28 that interfaces with the sub-managers of task manager 10. The sub-managers of task manager 10 include a command task manager 30, a function task manager 32, and a remote task execution manager 34. Task registration is performed by a task registration manager 36 which includes a task registration database (now shown). An abstract data access facility API 38 is provided for enabling the task manager 10 to interface with a data access facility (not shown) in order to access and interact with data objects associated with a task.

A network interface 40 is provided to interface computer system 12 to a network 42 in order to enable remote, multi-host task execution on similarly configured computer systems.

The task manager 10 is essentially an engine for executing non-interactive system management services, i.e., management tasks. The task manager 10 combines the features of prior art SAM facilities in a single facility utilizing one API 28. Further, the task manager 10 provides shared facilities for performing error handling, automatic event logging, loading in of the task description object from the task registration manager, and passing off of the task execution to one of the sub-managers 30, 32 and 34.

By utilizing the single management API 28, the registration process for function, command, and domain task descriptions are combined into a single task description language, and thereby, simplify the operation of SAM 24. In addition, rolled into this single management API 28 are the aforementioned features and the ability to communicate with a remote task execution agent or a remote computer system. Further, the single API 28 results in a more supportable product over time, and results in size and performance savings in the operation of computer system 12.

Figure 2:
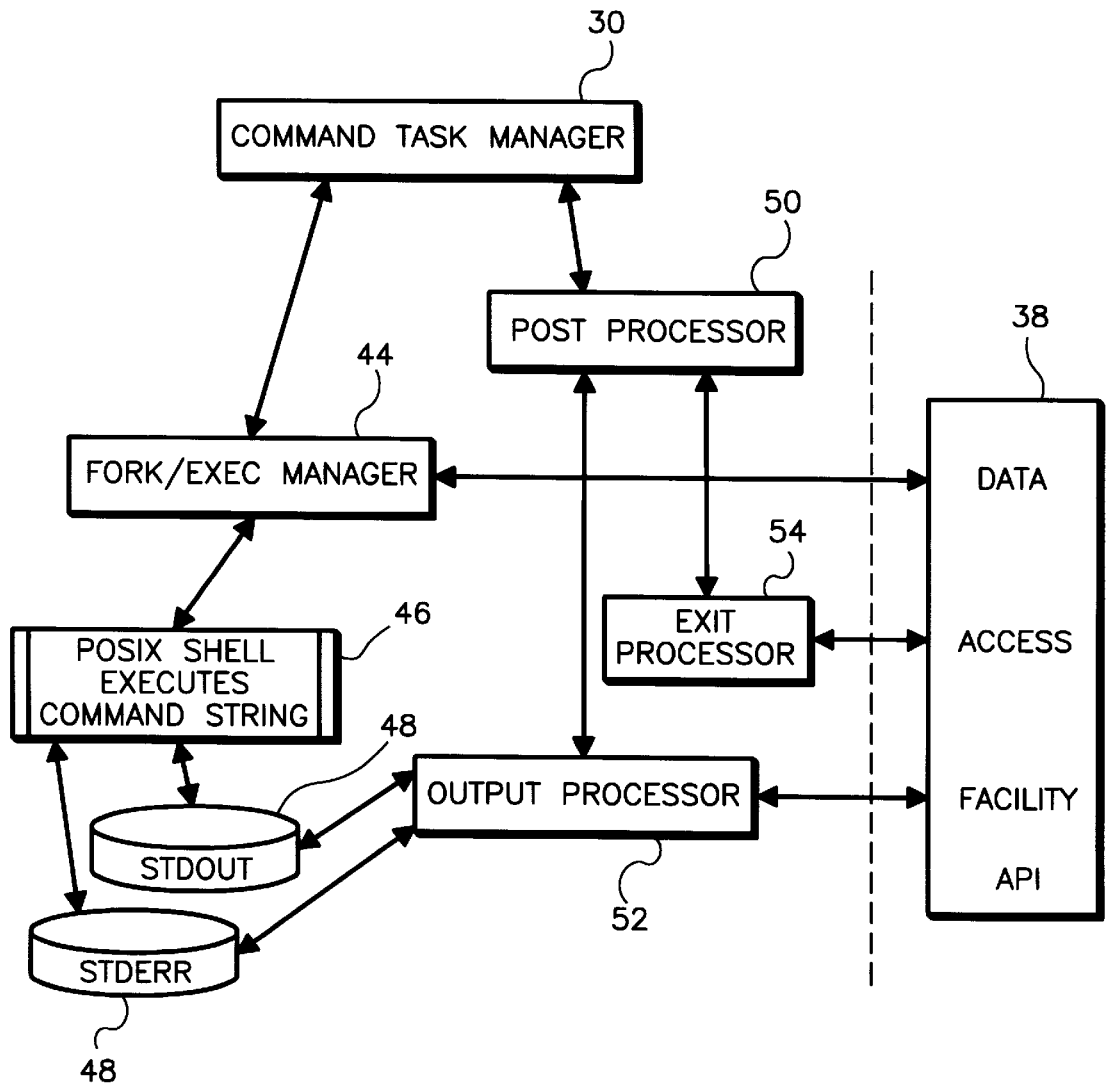
FIG. 2 is a block diagram of the command task manager of FIG. 1.

FIG. 2 illustrates an architecture of the command task manager 30. A command task comprises a single command execution string to be executed, instructions for how to process the command's output and error data, and an exit code. In the command task manager 30, a fork and execution manager 44 prepares to run the task by first forking the process and then preparing the environment for the execution of the command. The command is actually executed in a POSIX shell 46 and the outputs STDOUT and STDERR, as are described in detail hereinafter, are stored in temporary files 48. A post processor 50 coordinates the post processing, such as processing of the output data STDOUT and STDERR by an output processor 52 and the exit code of the command by an exit processor 54. As shown in FIG. 2, command task manager 30 interacts with the data access facility API 38 to retrieve data values that are included in the command execution string and to place processed output and error information produced by the post processors 52, 54 back into the task data handle, as explained in detail below, for return to the caller, that is, the particular system management application calling the task.

Figure 3:
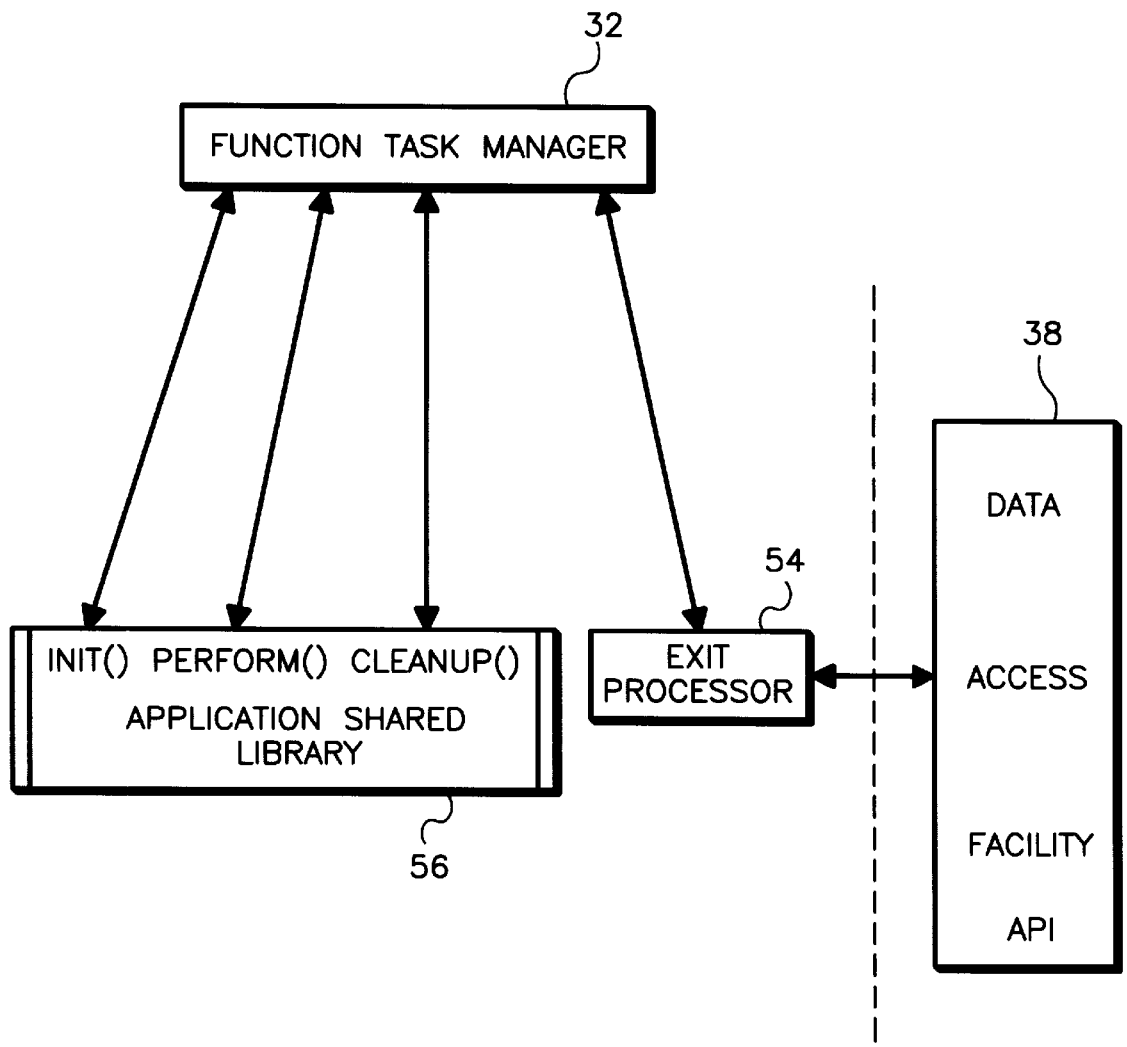
FIG. 3 is a block diagram of the function task manager of FIG. 1.

FIG. 3 illustrates an architecture for the function task manager 32. A function task comprises a sequence of up to three functions found in a shared library 56 that are executed. The three functions are called the init, perform, and cleanup functions. The init function provides a place to do any special initialization necessary to the task. The cleanup function allows for the cleanup of allocated data structures based on the exit code of the perform function. The init and cleanup functions are optional. The real work is done by the perform function which actually executes the task. With reference to FIG. 3, the function task manager 32 calls the designated functions (e.g. init, perform or cleanup) located in an application shared library 56 previously loaded by the task manager 30. Upon completion of the perform function, the exit processor 54 performs the optional exit code processing based upon the exit code from the perform function. The exit processor 54 is the same exit processor utilized by the command task manager 30. Further, as with the command task manager 30, the function task manager 32 interacts with the data access facility API 38 in its operation for placing error information produced by the exit processor into the task data handle for return to the caller.

Figure 4:
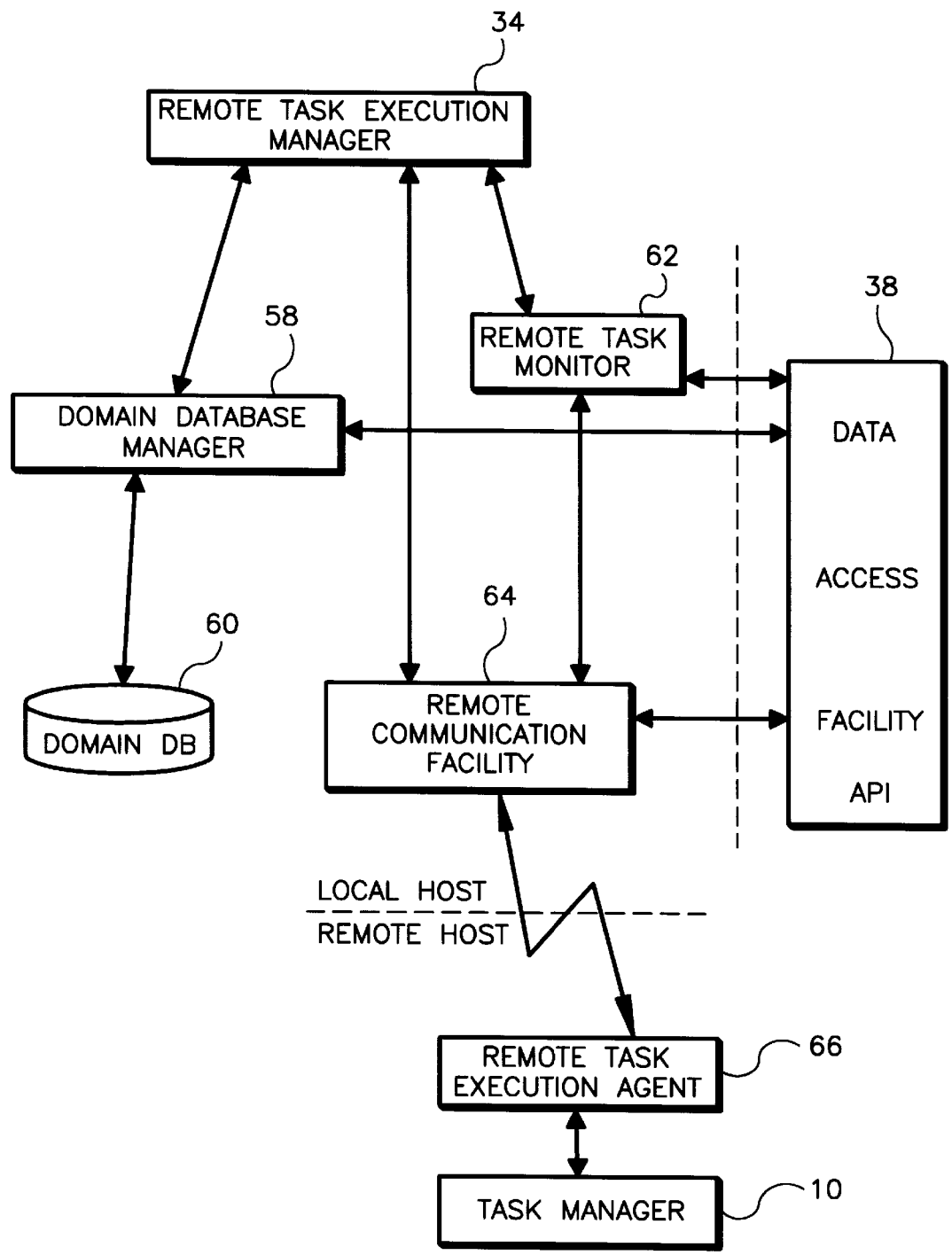
FIG. 4 is a block diagram of the remote task execution manger of FIG. 1.

FIG. 4 illustrates an architecture for the remote task execution manager 34. In the remote task execution manager 34, a domain database manager 58 is provided to operate in conjunction with domain database 60 in order to provide the remote task execution manager with relevant information regarding the remote client systems comprising the domain of the present computer system 12, such as the lists of client systems in the domain. The domain database 60 includes such information as a list of client systems in the domain, a list of shared resources and a list of shared policies. The domain database manager 58 is utilized to consult or change the content of the domain database 60. The remote task execution manager 34 may invoke a remote task monitor 62, which in turn invokes a remote communication facility 64, or may directly invoke the remote communication facility 64. The remote task monitor 62 operates to display to the user, via the display device 20, the current status of the task at the remote systems, including such information as error conditions, timeouts, and task completion. The remote communication facility 64 provides a communication interface with each of the client system for such functions as transferring the task itself, transferring the task data handle, invoking a remote task execution agent 66, and receiving the task data handle back from the remote clients systems. As with the other sub-managers, the remote execution task manager 34 interacts with the data access facility API 38 in operation.

It should be noted at this point that, in the embodiment chosen for illustrating the present invention, the remote task execution manager 34 is limited to performing remote tasks only on the clients of an NFS (network file system) diskless cluster. The NFS is a de facto standard method and protocol for sharing file system access between multiple computer systems 12 that are interconnected with the computer network 42. Included in the NFS is the capability to support the operation of a diskless computer system or client. Such a client has no directly attached disks or file systems, and therefore, must perform all of its file system and related disk operations using the NFS. For purposes of the present disclosure, an NFS diskless cluster is defined as a set of computer systems that all share a single NFS server for diskless operation. The SAM 24 provides management applications that are able to manage various resources that are shared by all the members of such a cluster. The remote task execution manager 34 has implicit knowledge of the semantics of the NFS diskless cluster, including how to determine the set of computer systems 12 of which it is composed. Hereinafter, the term cluster client, or simply client, refers to a member of such an NFS diskless cluster, whether it be the server of the cluster or one of the diskless clients on the server. Also, the only domain of computer systems that can be specified as the target of a given task is either the local host on which the task manager is running or the set of clients in the NFS diskless cluster to which the local host belongs.

II. Operation

Figure 5:
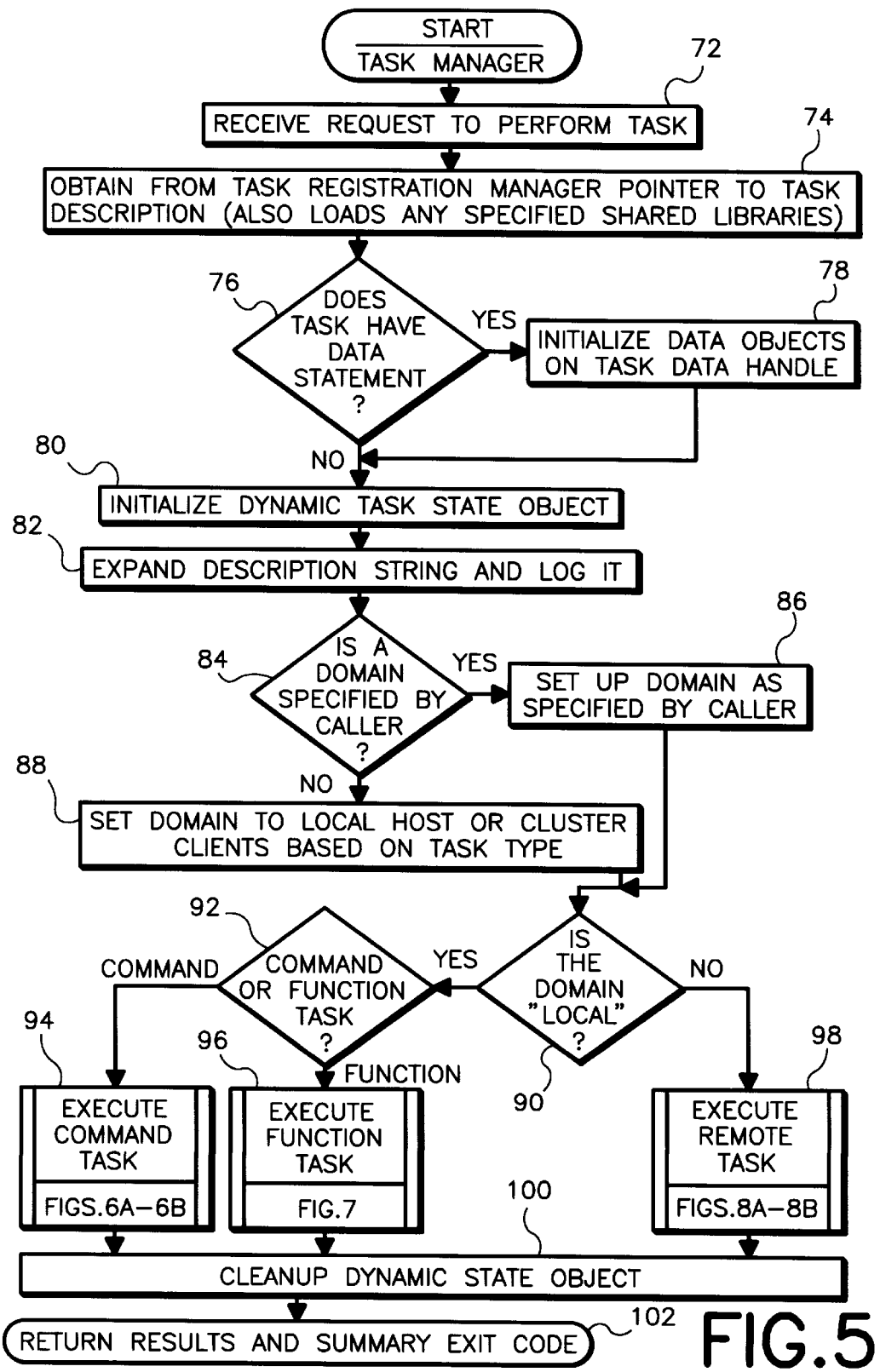
FIG. 5 is a flowchart of the operation of the task manager of FIG. 1.

The architecture and functionality of task manager 10 can be implemented with a computer program comprising executable steps that cause the computer system 12 to function in a particular manner as described below. FIG. 5 shows a flowchart of the preferred operation and sequence of events for such a computer program implementing the task manager 10.

The operation of task manager 10 begins at block 72 when a request or call to create and perform a named task is received. There are essentially three circumstances under which such a request is received by the task manager 10. The first circumstance is when a function call entry is called by the SAM 24, because a SAM application directly calls for the operation of a particular task. The second circumstance is when a domain task calls for a remote execution agent to call the task manager 10 to perform a function or command task. The last circumstance is when an application script calls for operation of a task via a command line interface.

Regardless of the circumstance, where (i.e., on what host or hosts) the task implementation resides or the type of underlying task (e.g., function, command, or domain), the request is delivered to the task manager 10 via API 28. Each request includes the following parameters: a task identifier or name that uniquely identifies which task is to be performed; a pointer to a task data handle containing the input parameters for the task and the task outputs on return; a bit mask field used to control some runtime behaviors of the task manager; and a domain specification that specifies the target computer systems on which to perform the task. The task identifier is a character string that uniquely identifies the task so that it can be located by the task manager 10 via the task registration manager 36. Further, task execution instructions, i.e., the task description, are provided with the system management application and are registered with the task registration manager 36 at product installation.

Worth discussing at this point is the operation of the task registration manager 36 in relation to the operation of the task manager 10. Generally, a set of task description are shipped with a system management application product (i.e., a SAM or SAM like product) and are registered by the task registration manager 36 at product installation. The task descriptions for all products using the task manager 10 are registered in a central location within task registration manager 36. The central registration provides access for any application using task manager 10 for the full range of tasks registered by all such management applications. This registration process is also key to being able to perform remote tasks on potentially heterogeneous systems via the task manager 10. Presumably, equivalent task registration information will reside on each computer system 12 in the domain in which task manager 10 is associated. Installation of the product includes placing the task description files on the system and registering the task description files with the task registration manager 36. Accordingly, at runtime, the task registration manager 36 makes the task description available to the task manager 10 for executing the task.

The task data handle is an opaque (to the task manager) container data structure that is used to pass to the task manager 10 the input parameters needed by the task and to return results produced by the task to the caller. This data structure is opaque in that the task manager 10 itself is unable to directly interpret or manipulate its contents. Instead, the task manager 10 must use the functionality of the data access facility to obtain data values from the handle and to place data values into the handle. The data access facility allows these task data handles to contain a wide variety of structured information that can be tagged with identifiers for easy reference. All of the data values obtained by the task manager 10 via the data access facility are referenced by a string identifier that uniquely specifies the data object in the handle to use and what field or attribute value of that object to obtain.

Most of the data object classes that can be placed into a task data handle are defined by the system management application. However, there are a few built in classes that are generally applicable. The "list" class can be used to create ordered lists of objects of some other class. These lists are often used to return identical attribute information about some number of manageable objects of a specific class, such as printers or disk drives. The "string" and "int" classes define objects with a single attribute that can contain either a character string value or an integer numeric value, respectively. Finally there is an "error" class that defines an error object that contains attribute fields used to describe specific error conditions that might occur during execution of a task.

The task manager 10 uses the "list" and "error" classes to create and/or use a list of error objects in the task data handle to pass information about one or more error conditions back to the caller for display to the user. The task manager 10 is configured to so rely on the data access facility so that it can be easily modified to support the many difference forms of object oriented data structures used in the industry.

A bit mask field is used to control some of the actions of the task manager 10 or the sub-managers 30, 32, 34 that need to vary from one invocation to another. Currently, there are three attributes defined by the bit mask field parameter: error object initialization, remote task execution monitoring, and the return data mode for multi host task execution. As already described, the task manager 10 is able to determine the presence of objects in the task data handle and to create new objects and place them into the handle. The error object initialization mode specified in the bit mask field specifies the rules for the task manager 10 to follow regarding the initialization of the list of error objects in the handle as previously described. The remote task execution monitoring mode indicates whether an interactive, non-interactive, or custom monitor is to be used to monitor the execution of tasks on remote systems. The return data mode indicates whether task data that results from the execution of tasks on one or more remote computer systems is to be returned from the task manager to the caller.

The domain parameter specifies which computer system on which to perform the task. By default, if the domain parameter is set to a null value, function and command tasks have a "local" domain. That is, the only computer system 12 or host on which the task is executed is the one on which the task manager 10 is currently installed and running. Similarly, domain tasks have a "cluster" domain which indicates all the computer systems or hosts that are clients of the NFS diskless cluster to which the local host belongs.

Referring back to FIG. 5, once a task request has been received, block 74 obtains from the task registration manager 36 a pointer to the task description. The task description includes such information as the type of task (e.g., function or command), the code to invoke (e.g., command string or function names), how to process the data, what log information to generate, and how to handle error conditions. In addition to obtaining this information from the task registration manager 36, the task registration manager 36 simultaneously loads any shared library specified in the task description for the operation of that specific task.

Next, block 76 uses the task description to determine whether the task has a data statement. This statement is used to specify objects that must be in the task data handle for correct execution of the task. Typically, this statement is used to guarantee the existence in the handle of one or more lists of a specific type or types so that later, when an output post processor is parsing the STDOUT or STDERR output of a command, the list or lists can be populated with objects containing the parsed information about multiple instances of some managed object. If a data statement is found, then block 78 uses the data access facility via the data access facility API 38 to determine if objects of the specified classes and identifiers are already in the handle. If any specified data objects are not found in the handle, then empty instances are created and placed into the handle.

Block 80 then initializes a dynamic task state object for this specific invocation of the task manager 10. The dynamic state object includes a variety of information such as the runtime attributes specified in the bit mask field parameter, internal values used by one or more sub-managers in their operation, and task variables such as the task identifier, the task description, the task exit code, and the contents of STDOUT or STDERR for command tasks. This dynamic state object is then placed on a push down stack to enable the task manager API 28 to be reentrant. Subsequently, in block 82, the description string of the task is expanded, substituting defined fields in the description string with information obtained from the task data handle. This expanded description is placed in the dynamic task state object and is automatically logged by the task manager 10.

If a domain is specified by the caller, then block 84 transfers to block 86 where the domain is set up as specified by the caller. If a domain is not specified, block 84 transfers to block 88 where the domain of the task is set to the local host or to the cluster domain based on the task requested. Once the domain has been set by either block 86 or 88, block 90 determines if the set domain is local host or the cluster domain. If the domain is the cluster domain, then block 90 transfers to module 98 where the remote task execution manager 34 is called, and the task is executed.

If, at block 90, it is determined that the domain is the local host, then block 90 transfers to block 92 where it is determined whether the task is a command or function task. If the task is found to be a command task, then block 92 transfers to module 94 where the command task manager 30 is called and the command task is executed. If it is a function task, then block 92 transfers to module 96 where the function task manager 32 is called and the function task is executed.

At the completion of any one of the modules 94, 96 or 98, block 100 cleans up the dynamic state object and block 102 returns the summary exit code to SAM 24.

The following description is directed to illustrating the utility and functionality of each of the modules 94, 96 and 98 described above. A flowchart of an embodiment of each particular module is provided at the Figure number within the box of the modules in FIG. 5.

A. Command Task Manager

Figure 6A:
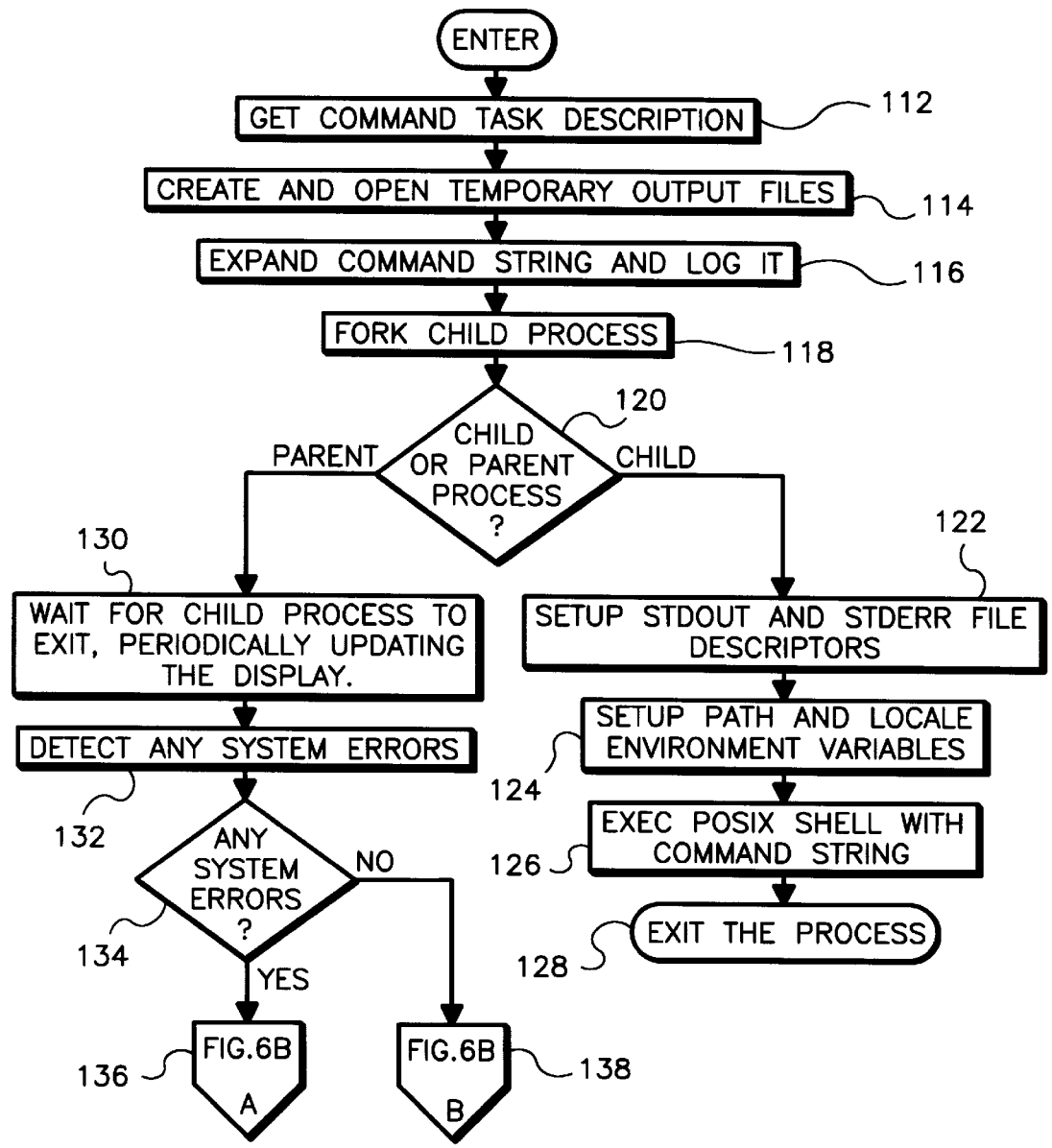
FIGS. 6A and 6B are flowcharts of the operation of the command task manager of FIG. 2.

With reference to FIG. 6A, upon entering the command task manager 30, the command task manager initially receives task information as indicated at block 112. The task information includes the pointer to the task description, a pointer to the dynamic task state object, and a pointer to the task data handle. Block 114 then creates and opens temporary output files using unique file names. These temporary output files will later be designated as STDOUT and STDERR for the child process described below. Next, block 116 expands the command string of the task description and logs it. The process of command string expansion is a process of parsing the string in the task description, placing literal string information into the expanded string, and replacing any data field references with data values found in the task data handle, such data values being input parameters to the task.

In order to run the command while the present process is ongoing, the process is forked into a parent process and a child process at block 118. This essentially enables two separate execution sequences to operate, and hence, simultaneous processing. The child process is assigned a process identification at block 120 and the child process is transferred from block 120 to block 122 where the temporary files created by block 114 are set up as STDERR and STDOUT for the child process. Next, the environment variables, i.e., command path and locale variables, are set up in the child process by block 124. This essentially sets up the environment for running the command task. Block 126 then executes a POSIX shell with the command string. The POSIX shell is a command interpreter that interprets the command string and performs the steps therein. Once all the command steps have been completed, the child process exits at block 128.

At substantially the same time, block 130 of the parent process is awaiting for the child process to exit, while periodically refreshing the screen. At the death of the child process, block 130 transfers to block 132 where any system errors are detected. This step essentially determines whether the child process died for expected reasons or whether the reasons were unexpected so as to call for special action to be taken. System errors usually result from problems in the environment in which the SAM 24 is operating, i.e., insufficient memory or disk space. These types of errors can usually be avoided by explicit steps taken by the user, and therefore, should be addressed immediately. Accordingly, block 134 determines if there were any system errors, and if so, transfers to block 136. If no system errors are found, then block 134 transfers to block 138.

Figure 6B:
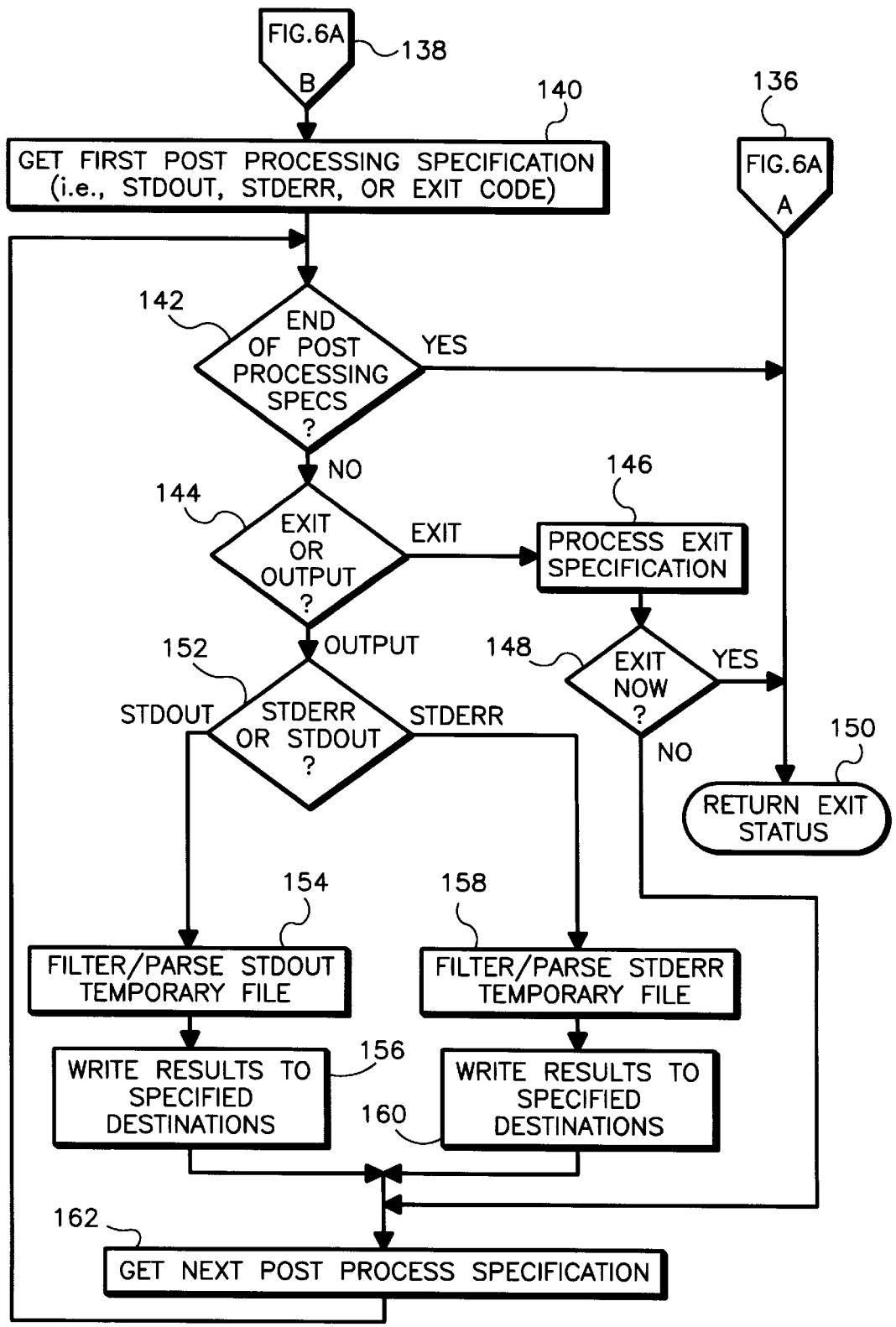

Referring now to FIG. 6B, if a processing error is found by block 134 (FIG. 6A), block 134 transfers to block 136 which transfers to block 150 where the command task manager adds an error object to the list in the task data handle previously described, and then returns an error exit code to the task manager 10, ending the operation of command task manager 30. The error object describes the specific system error and its contents can be used to display an appropriate message to the user via display device 20. If no system errors are found by block 134, the process proceeds to block 138 which transfers to block 140. At block 140, the first post process specification is obtained for processing.

The post processing specifications are all optional. There are three types of post processing specifications for a command task: STDERR, STDOUT and exit code. If the post process specification is either for STDERR or STDOUT, command output processing steps are performed in which the output data is parsed and written out. If the post process specification is for the exit code, then exit code processing is performed as designated in the exit processing specification of the task description. There can be at most three post process specifications in a command task description, and only one of each type. The order in which these steps are performed is specified in the task description.

Block 142 determines whether all the post process specifications have been processed. If all the post processing specifications have not been processed, then block 142 transfers to block 144 where it is determined if the next post process specification is an exit code specification or an output specification. If it is an exit code specification, then block 144 transfers to block 146 where the exit code post process specification is processed. Block 146 then transfers to block 148 where it is determined if the command task manager 30 should exit at that point, as determined in processing the exit code. If so, block 148 transfers to block 150 where the exit code of the command, optionally modified by an exit code post processing specification, is returned to the task manager 10. If block 148 determines not to exit, then it transfers to block 162 where the next post process specification is obtained. Block 162 then transfers back to block 142 where, as previously discussed, it is determined if all the post processing specifications have been processed. If there are no more post process specifications to process, then block 142 transfers to 150 which returns the exit code to the task manager 10 as previously discussed.

If, alternatively, block 144 determines that the post processing specification is an output specification, then block 144 transfers to block 152 where it is determined if the specification is for STDERR or STDOUT. The POSIX shell of the child process is able to nominally produce two separate streams of output information from the commands it executes and these streams are called standard output (or STDOUT) and standard error (or STDERR). The standard output stream contains the expected output information from the executed command(s). If the command is a query like command, then the information it has gathered is returned on the standard output stream. The standard error stream typically contains any error messages produced by the command (s) executed. Often the standard error stream is empty but in some instances errors can occur that produce informational messages on the standard error stream. The output post processor can be configured by a post processing specification to filter or parse either STDOUT or STDERR and transfer the result to a few selected destinations, such as the following: output fields in the task data handle for return to the caller, a message displayed directly to the user, a specific named file, or the log file. If the specification is for STDOUT, then block 152 transfers to block 154 where the STDOUT output is filtered and parsed, and then transfers to block 156 where the result is written out to one of the specified destinations. From block 156, the process continues at block 162 where the next post process object is obtained. If block 152 determines the specification is for STDERR, then block 152 transfers to block 158 where the STDERR output is filtered and parsed, and then transfers to block 160 where the result is written out to a specified destination. From block 160, the process continues to block 162 where the next post process specification is obtained. Once all that post process specifications have been processed, block 142 transfers to block 150 as previously discussed.

B. Function Task Manager

Figure 7:
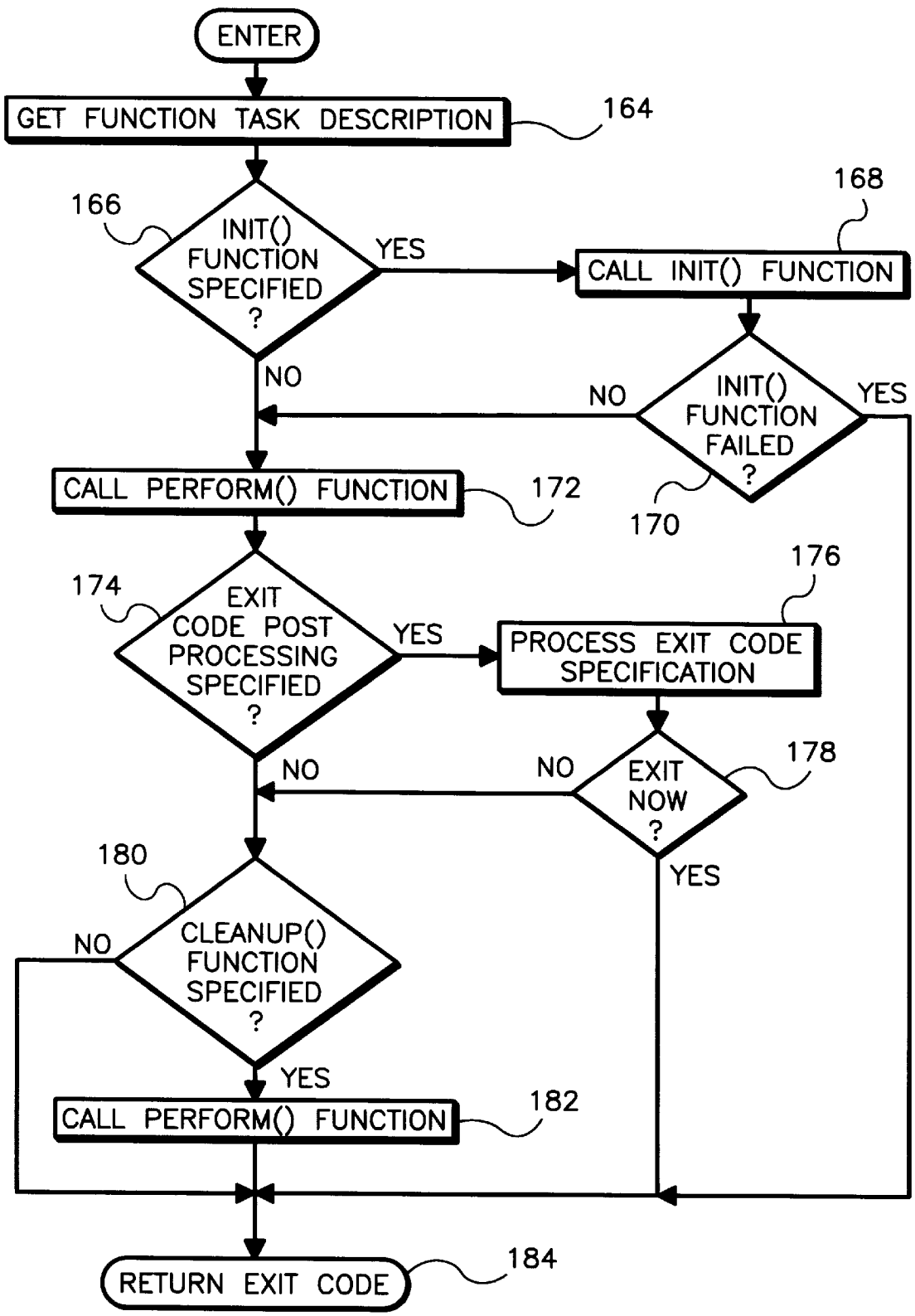
FIG. 7 is a flowchart of the operation of the function task manager of FIG. 3.

With reference to FIG. 7, upon entering the function task manager 32, block 164 obtains the function task description. Block 166 then determines if an init function is specified in the task description. If an init function is specified, block 168 calls and executes the init function. If the init function fails, block 170 transfers to block 184 which returns the exit code from the init function to the task manager 10. If no init function is specified, block 166 transfers to block 172 where a perform function is called. In addition, if there was an init function which did not fail, the process transfers from block 170 to block 172.

At block 172, the perform function is called and executed. The perform function may include several nested tasks requiring reentry into task manager 10 for execution of the nested task. During this process, the push down stack of dynamic state objects keeps track of the nested tasks so that at the end of each task the task manager state returns to the appropriate previous state. At the completion of the perform function, block 172 transfers to block 174.

Block 174 determines whether an exit post processing specification is in the task description. If an exit post processing specification is found, then block 174 transfers to block 176 where the exit code of the perform function is processed per that specification. Upon completion of the processing of the exit specification, block 176 transfers to block 178 where it is determined if the task is to exit at this point as determined by the exit code post processing specification. If the process is to exit at this point, then block 178 transfers to block 184 which returns the perform function exit code, optionally modified by the exit code processing, to the task manager 10. Note, as mentioned above, the optional exit code processing performed here is identical to that which can be specified for command tasks. If the process is not to exit at this point, then block 178 transfers to block 180. Likewise, if there was not an exit post process object specified, block 174 similarly transfers to block 180.

Block 180 determines if any cleanup function is specified, and if so, transfers to block 182 where the cleanup function is called and executed. If no cleanup function is specified, then block 180 transfers to block 184 which returns the perform function exit code, optionally modified by any exit code processing, to the task manager 10. If a cleanup function was called in block in 182, upon completion of the cleanup function, then block 182 transfers to 184 which returns the exit code of the cleanup function to the task manager 10. Note, as evidenced above, the init and cleanup functions do not have to be designated, but a perform function must be designated in the task description.

C. Remote Task Execution Manager

Figure 8A:
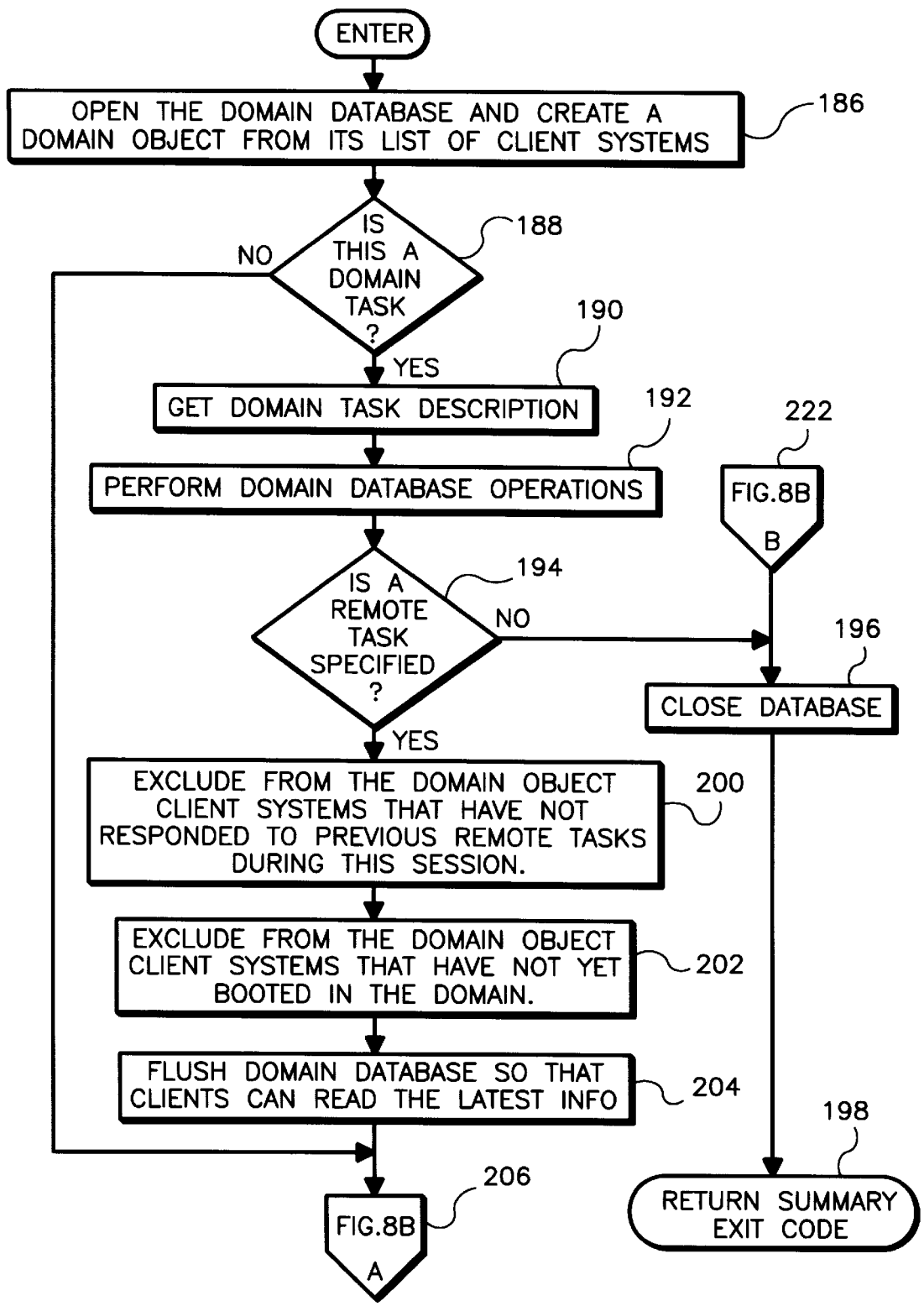
FIGS. 8A and 8B are flowcharts of the operation of the remote task execution manager of FIG. 2.
Figure 8B:
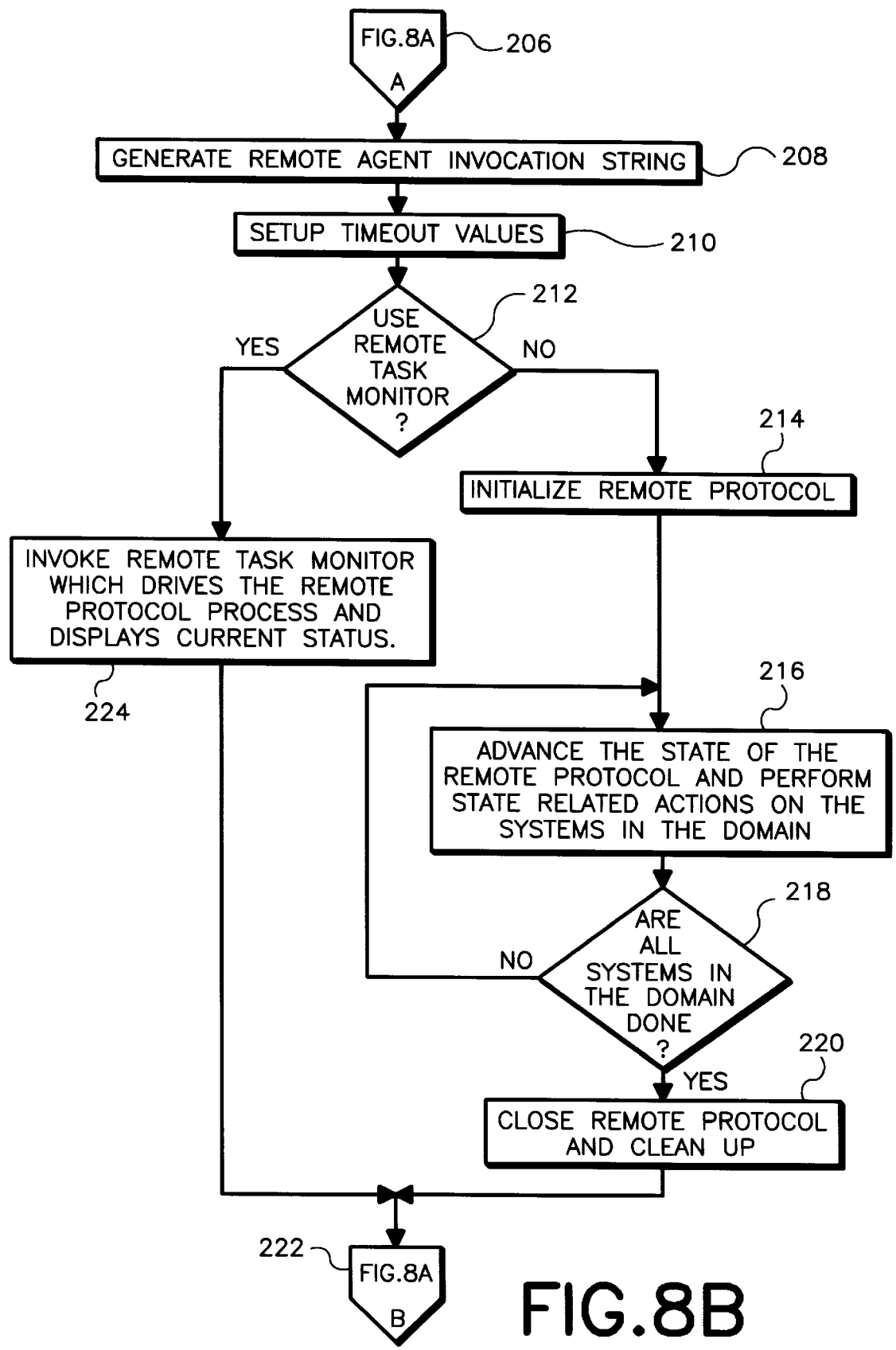

With reference to FIGS. 8A–8B, upon entering the remote task execution manager 34, block 186 opens the domain database 60 (FIG. 4), and obtains a lock on it to prevent problems with task managers operating on other systems in the domain. It then creates a domain object from the list of client systems in the database. Block 188 determines if the task is a domain task or a command or function task. If the task is a domain task, then block 190 obtains the domain task description. Block 192 performs any queries or updates on the domain database per the task description by either placing information in or using information from the task data handle. Block 194 determines if the task description specifies a remote task to be performed. If there is no specified remote task, then the process transfers to block 196 which closes the domain database. The process then transfers to block 198 which returns a summary exit code to the task manager 10.

Alternatively, if a remote task is specified, then block 194 transfers instead to block 200 which excludes from the list of clients in the domain object those clients which have not responded to previous remote tasks during the current session. Block 202 excludes from the list of remote clients those which have yet to actually join the NFS diskless cluster by booting up as a member of the cluster. Block 204 then writes out all modifications performed on the domain database so that the database files are current. This operation is done so that when the remote clients are performing the specified task, the task managers operating on those remote systems have access to all the latest updated information.

The database operations being completed, the process transfers to block 206 and then on to block 208. Block 208 creates the command invocation string that will be used to invoke the remote execution agent 66 (FIG. 4) on the remote client systems. Block 210 determines the values for various timeouts associated with the remote communication protocol such as the connection timeout or the agent invocation timeout. These timeouts are necessary to prevent the remote task execution manager from waiting forever for a remote client to perform a task in cases where some network or system error prevents the remote execution agent from properly returning results.

Then block 212 determines, based upon the task dynamic state object, whether to invoke the remote task monitor 62 (FIG. 4) or whether to directly call the remote communication facility 64 (FIG. 4). If it determines not to invoke the remote task monitor 62, then the process transfers to block 214 which initializes the remote communication protocol. Block 216 is the beginning of a processing loop which transmits the task and the task data handle to the remote systems, invokes the remote execution agent 66 using the invocation string previously described, and monitors the progress of the remote tasks checking for error conditions, timeouts, and task completion. Block 218 decides whether there are still any remote tasks still in progress, and if so, transfers back to block 216 to continue the waiting and monitoring. If instead, all the remote execution agents have completed, or, alternatively have timed out or failed, then block 218 transfers to block 220 which closes the remote communication protocol, disposing of any allocated data structures and generally cleaning up. As part of this block, the results of the task execution on each of the remote clients in the domain object are written to the log.

Finally, the process transfers to block 222 and then on to blocks 196 and 198 (FIG. 8A) which, as previously stated, close the domain database and return the summary exit code to the task manager 10. If block 212 (FIG. 8B) determines instead to use the remote task monitor 62, then it transfers to block 224. Block 224 performs the same steps as are performed by blocks 214 through 220, but it also displays to the user, via the display device 20, a screen that shows the ongoing progress of each of the remote clients. It has a processing loop similar to blocks 216 and 218 that also updates the display screen as remote clients either complete the task or fail in some way. Similarly, when all the remote clients in the domain object have either completed the task or have failed, the process transfers to block 222 and then on to blocks 196 and 198, as previously described. The summary exit code returned by block 198 is determined based upon whether all the remote clients succeeded or whether some failed. In addition, block 198 coalesces the data returned on the task data handles from all of the remote clients into the single task data handle originally passed to the task manager according to the return data mode field in the task dynamic state object.

In concluding the detailed description, it should be noted that it will be obvious to those skilled in the art that many variations and modifications may be made to the preferred embodiment without substantially departing from the principles of the invention. All such variations and modifications are intended to be included herein within the scope of the present invention, as set forth in the following claims. Further, in the claims hereafter, the structures, materials, acts, and equivalents of all means or step plus function elements are intended to include any structures, materials, or acts for performing the recited functions.

Wherefore, the following is claimed:

1. A task management method for creating and performing a system management task at a local computer system that can communicate with one or more remote computer systems, comprising the steps of:

receiving a request to perform a command task and a request to perform a function task via a single common application program interface (API), each of said requests include a task identifier, a pointer to a task data handle associated with said management task, a bit mask field, and a domain specification;

utilizing said task data handle to obtain data values from a data access facility;

utilizing said bit mask field to control a mode of monitoring said tasks, said bit mask field including error initialization, remote task execution monitoring and return data mode attributes;

obtaining a pointer to a task description associated with said command task and a pointer to a task description associated with said function task;

determining a domain for said command task and a domain for said function task;

invoking a remote task execution manager for performing said command task if said domain of said command task specifies a remote computer system and for performing said function task if said domain of said function task specifies a remote computer system;

invoking a command task manager for performing said command task if said domain of said command task specifies said local computer system; and invoking a function task manager for performing said function task if said domain of said function task specifies said local computer system.

2. The method of claim 1, further comprising the step of loading a shared library for the operation of said tasks prior to performing said tasks.

3. The method of claim 1, further comprising the step of passing error condition information regarding operation of said tasks.

4. The method of claim 1, further comprising the step of automatically logging significant events occurring during execution of said tasks.

5. The method of claim 1, further comprising the step of initializing data objects on a task data handle associated with said tasks.

6. The method of claim 1, further comprising the step of initializing a dynamic state data structure into which information is gathered regarding execution of one of said tasks.

7. The method of claim 6, further comprising the step of disposing of said dynamic data structures upon the completion of said one of said tasks.

8. A task manager system for creating and performing system management tasks, comprising:

a command task manager for performing command tasks;

a function task manager for performing function tasks;

a remote task execution manager for performing a command task on a remote computer system;

a single common application program interface (API) configured to interface requests for said command tasks with said command task manager and configured to interface requests for function tasks with said function task manager in response to requests from a system administration manager associated with a computer system, each of said requests include a task identifier, a pointer to a task data handle associated with a management task to obtain data values from a data access facility, a bit mask field to control a mode of monitoring said tasks and including error initialization, remote task execution monitoring and return data mode attributes, and a domain specification used to determine a domain for said command task and a domain for said function task; and wherein said single common application program interface invokes said remote task execution manager for performing said command task if said domain of said command task specifies a remote computer system and for performing said function task if said domain of said function task specifies a remote computer system, said single common application program interface invokes a command task manager for performing said command task if said domain of said command task specifies said local computer system, and said single common application program interface invokes a function task manager for performing said function task if said domain of said function task specifies said local computer system.

9. The system of claim 8, further comprising a remote task execution manager for performing domain and remote tasks, wherein said API is further configured to interface command tasks and function tasks that specify a remote computer system with said remote task execution manager.

10. The system of claim 8, further including an exit code processor for processing the exit code values.

11. The system of claim 8, further including a data access facility API for interfacing said task manager with said data access facility.

12. The system of claim 8, wherein said command task manager comprises:

a fork and execute manager for preparing for execution of the command task and for forking operation into a child process and executing the POSIX shell to perform the execution of the command task;

a post processing manager for managing operation of an output processor and an exit code processor; and an output processor for processing normal and error output information from said child process.

13. The system of claim 12, wherein said function task manager comprises:

a mechanism for calling a function in a shared library by name; and a mechanism for invoking an exit code post processor using an exit code value from said called function.

14. The system of claim 8, wherein said remote task execution manager comprises:

a domain database manager and a domain database; and a remote communication facility.

15. The system of claim 8, further comprising:

a processor;

an input device;

a display;

a memory;

an interface for connecting said processor with said input device, said display, and said memory; and wherein said task manager system is disposed within said memory.

16. The system of claim 15, further comprising an interface to a computer network for connecting said system with other similar systems.

17. A computer readable medium having a computer program for managing the execution of tasks, said computer program comprising:

a command task manager for performing command tasks;

a function task manager for performing function tasks;

a remote task execution manager for performing a command task on a remote computer system;

a single common application program interface configured to interface requests for said command tasks with said command task manager and configured to interface requests for function tasks with said function task manager in response to requests from a system administration manager associated with a computer system, each of said requests include a task identifier, a pointer to a task data handle associated with a management task to obtain data values from a data access facility, a bit mask field to control a mode of monitoring said tasks, and including error initialization, remote task execution monitoring and return data mode attributes, and a domain specification used to determine a domain for said command task and a domain for said function task; and wherein said single common application program interface invokes said remote task execution manager for performing said command task if said domain of said command task specifies a remote computer system and for performing said function task if said domain of said function task specifies a remote computer system, said single common application program interface invokes a command task manager for performing said command task if said domain of said command task specifies said local computer system, and said single common application program interface invokes a function task manager for performing said function task if said domain of said function task specifies said local computer system.

18. The computer-readable medium of claim 17, wherein said computer program further includes an exit code processor for processing exit code values.

19. The computer-readable medium of claim 17, wherein said computer program further includes a data access facility application program interface (API) for interfacing said sub-managers with a data access facility.

\* \* \* \* \*

UNITED STATES PATENT AND TRADEMARK OFFICE
CERTIFICATE OF CORRECTION

PATENT NO.    : 6,148,323
DATED         : November 14, 2000
INVENTOR(S)   : Richard B. Whitner et al.

It is certified that error appears in the above-identified patent and that said Letters Patent is hereby corrected as shown below:

Title page,
Item [54], Title, after "MANAGEMENT" insert -- TASKS --

Column 1,
Line 3, after "MANAGEMENT" insert -- TASKS --

Signed and Sealed this

Twenty-second Day of October, 2002

Attest:

JAMES E. ROGAN
Attesting Officer                Director of the United States Patent and Trademark Office